United States Patent [19]

Leveille et al.

[11] Patent Number: 4,499,455

[45] Date of Patent: Feb. 12, 1985

[54] ALARM CIRCUIT INTERFACE UNITS

[75] Inventors: Michael A. Leveille, Newton; Charles F. Walker, Derry, both of N.H.

[73] Assignee: AT&T Bell Laboratories, Murray Hill, N.J.

[21] Appl. No.: 374,505

[22] Filed: May 3, 1982

[51] Int. Cl.$^3$ ........................ G08B 1/00; H04M 11/04

[52] U.S. Cl. .................................... 340/531; 340/505; 340/506; 340/518; 340/534; 340/825.05; 340/825.03; 179/5 R

[58] Field of Search ............... 340/531, 500, 502, 503, 340/504, 505, 506, 508, 518, 533, 534, 825.05–825.14, 825.21, 825.29, 825.52, 825.54, 825.03, 825.04; 179/5 R, 5 P

[56] References Cited

U.S. PATENT DOCUMENTS 3,715,725 2/1973 Kievit et al. .................. 340/825.54
3,927,404 12/1975 Cooper ............................... 340/533
4,103,337 7/1978 Whiteside ............................ 340/505
4,162,488 7/1979 Silverman et al. .................. 340/503
4,311,986 1/1982 Yee ................................ 340/825.54

*Primary Examiner*—Donnie L. Crosland
*Attorney, Agent, or Firm*—David R. Padnes; Thomas Stafford

[57] ABSTRACT

Bidirectional communications between an alarm loop, comprising one or more alarm transmitters, and a remote receiver is provided through a digital transmission facility by a pair of interface units (201,301). Each interface unit, disposed at an end of the digital transmission facilities, provides encoding and decoding of signals to and from the alarm receiver. For greater reliability, each interface unit (601,701) can be adapted to select signals received from different digital transmission facilities.

9 Claims, 7 Drawing Figures

ALARM CIRCUIT INTERFACE UNITS

TECHNICAL FIELD

The present invention relates to circuitry for interfacing an alarm loop, comprising one or more alarm transmitters, and a digital transmission facility.

BACKGROUND OF THE INVENTION

The alarm industry provides protection for billions of dollars worth of property and is growing at a rapid rate each year. Typical alarm services provided to the public include burglar alarms, automatic and manual fire alarms, sprinkler system supervision and industrial process supervision.

A significant number of alarm services utilize telecommunications facilities to communicate bidirectional signals between an alarm loop and a remote alarm receiver. The alarm loop comprises one or more alarm transmitters. In general, the telecommunications facilities employed are metallic loops and trunks, i.e., facilities which do not multiplex signals but merely conduct the signals as supplied by an alarm transmitter or alarm receiver. These metallic facilities often extend up to 90 miles. While metallic facilities are highly reliable, their usage presents several problems. First, the number of available wire pairs is becoming increasingly scarce due to the widespread deployment of digital facilities, such as the T-carrier systems. Second, the cost of installing and maintaining long lengths of metallic facilities is very expensive. To overcome these problems, prior art systems have been developed which code and multiplex alarm transmitter signals over digital carrier systems. Such systems, however, are quite expensive and do not provide bidirectional communications capability between the alarm transmitters and the alarm receiver.

SUMMARY OF THE INVENTION

In accordance with the present invention, bidirectional communications between an alarm loop, comprising one or more alarm transmitters, and a remote alarm receiver is provided through a digital transmission facility by a pair of interface units. Each interface unit, disposed at an end of the digital transmission facility, provides encoding and decoding of signals to and from the alarm receiver.

During alarm circuit operation, the first interface unit supplies a signal source to the alarm loop and encodes one or more signals from the alarm loop which are a function of the signal source and the status of the alarm transmitters. These encoded signals are subsequently decoded by the second interface unit and transmitted to the alarm receiver. To provide alarm circuit integrity during fault conditions, the supplied signal source is varied in response to a signal transmitted from the alarm receiver and/or the second interface unit. In the latter case, the second interface unit automatically transmits a signal to vary the signal source in response to signals received from the first interface unit. Once the fault has been corrected, the second interface unit also restores the supplied signal source to its pre-fault condition.

It is a feature of the present invention that the first and second interface units can be adapted to select signals received from two different digital transmission facilities to increase end-to-end alarm circuit reliability.

DETAILED DESCRIPTION

Figure 1:
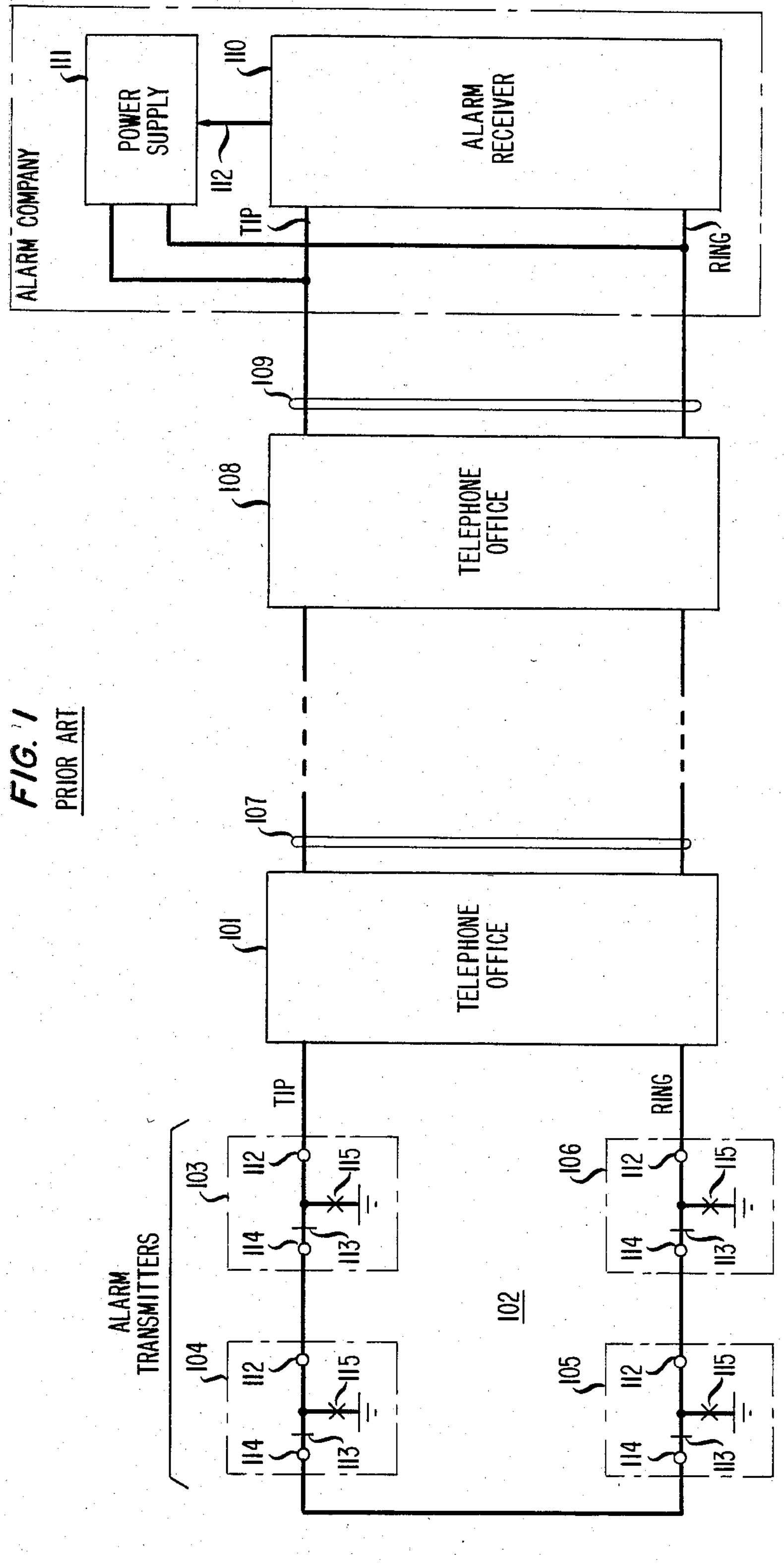
FIG. 1 PRIOR ART
FIG. 1 is an illustrative block-schematic diagram of a prior art circuit for communications between one or more alarm transmitters and a remote alarm receiver.

FIG. 1 is an illustrative prior art alarm circuit which utilizes telecommunications facilities to interconnect one or more customer-located alarm transmitters to a remote alarm receiver. Each alarm transmitter is generally located in a different protected premises. Telephone office 101 interconnects alarm transmitter loop 102 comprising serially connected alarm transmitters 103, 104, 105 and 106 to metallic trunk 107. The ends of electrically conductive loop 102 are commonly referred to as tip and ring. In similar fashion, telephone office 108 interconnects electrically conductive loop 109 comprising alarm receiver 110 and power supply 111 in the alarm company, to metallic trunk 107.

In the illustrative alarm circuit, commonly referred to as a McCulloh circuit, power supply 111 supplies a voltage potential across the tip and ring ends of loop 109 which also appears across the tip and ring ends of loop 102 due to the direct interconnection of loops 102 and 109 by trunk 107. The supplied voltage potential can be varied from "normal battery" operation to "double battery" operation and vice versa in response to a signal on lead 112 from alarm receiver 110. In normal battery operation, a voltage potential is applied to one end of loop 109 and the other end is grounded. In double battery operation, generally reserved for testing or maintaining alarm circuit integrity under a fault condition, each end of loop 109 is supplied with a different, non-zero voltage potential.

Alarm transmitters 103, 104, 105 and 106 are normally closed in the absence of an alarm condition. During normal battery operation, a dc current flows from the tip end of loop 109 through the metallic trunk and alarm transmitter loop to the ring end of loop 109. Circuitry within alarm receiver 110 detects the absence of an alarm by sensing the presence of current in both the tip and ring ends of loop 109. During an alarm condition, the affected transmitter signals the alarm receiver by opening the loop 102, closing loop 102, applying a ground to loop 102 and then removing the ground from loop 102. For purposes of illustration, this 3-state alarm sequence is achieved by sequentially opening contact 113, closing 113, closing contact 115 and then opening contact 115.

Each alarm transmitter performs the 3-state alarm sequence in a particular time-coded sequence. During an alarm, the tip to ring current ceases, then resumes, and then a current flows from the ground applied by the activated alarm transmitter to the ring end. The status of the alarm transmitters, i.e., the existence or non-existence of an alarm condition, is detected by sensors in the alarm receiver which monitor the presence or absence of a current at the tip and ring ends of loop 109. Since each transmitter is assigned a unique time-coded sequence, identification of the particular transmitter signaling an alarm can be determined by noting the time duration of each state in the 3-state alarm sequence and/or the number of times the 3-state alarm sequence is repeated.

Now consider the existence of an open circuit in alarm loop 102 due to the defect in one of the electrical conductors connecting the alarm transmitters. Under normal battery operation, there is no current flow and the ability of the alarm receiver to detect an alarm condition is lost. If an open conductor is suspected, however, alarm circuit integrity can be maintained by applying a different nonzero voltage to the tip and ring ends of loop 109 under double battery operation. Double battery operation permits the detection of the third, i.e., ground, state of the 3-state alarm sequence during an open circuit fault.

Figure 2:
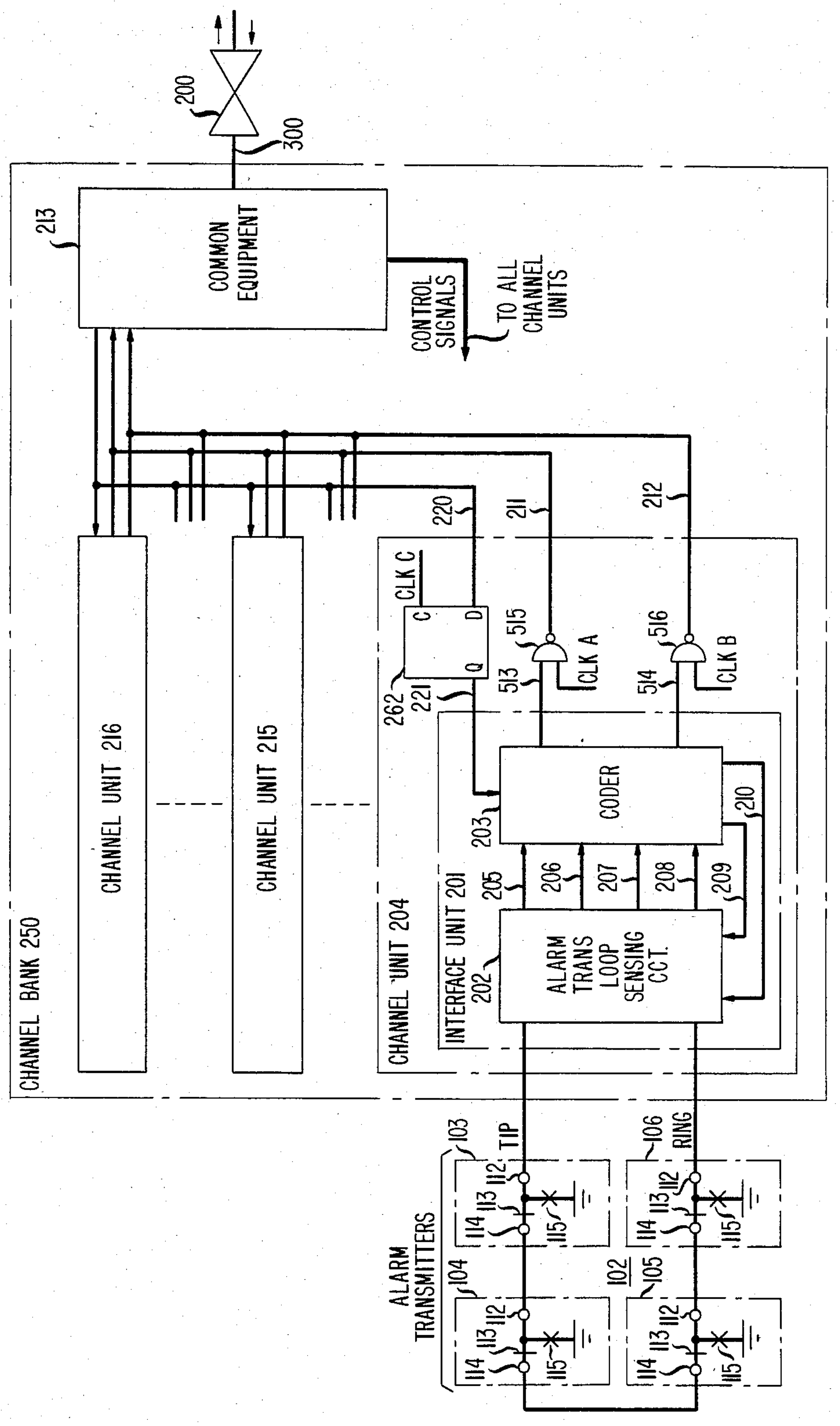
FIGS. 2 and 3 are a first illustrative block-schematic diagram, in accordance with the present invention, for communications between one or more alarm transmitters and a remote alarm receiver.
Figure 3:
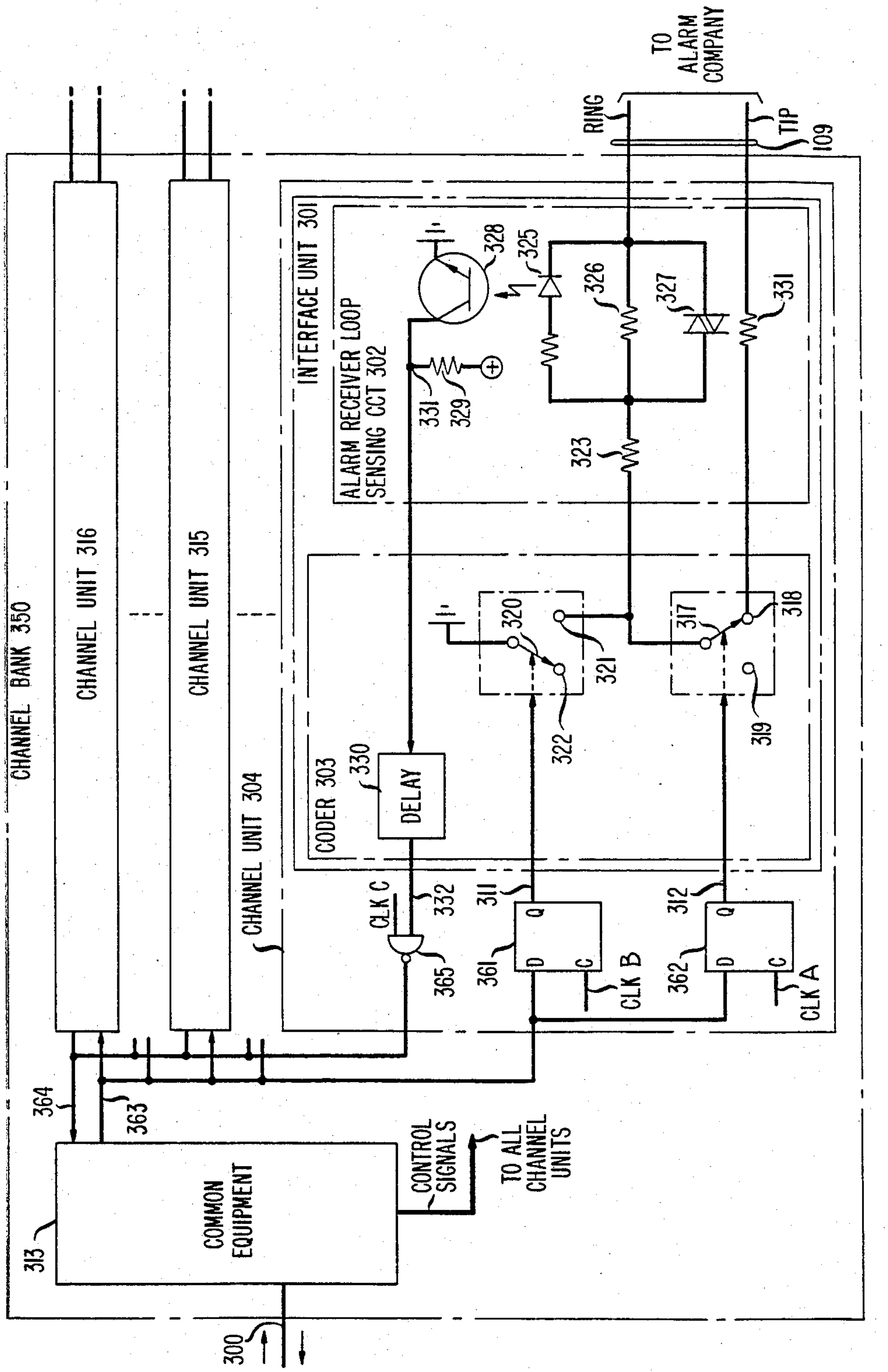

While McCulloh alarm circuits operate satisfactorily through a metallic facility, they typically require 19 gauge metallic trunks. Such trunks are becoming scarce and are expensive to maintain. FIGS. 2 and 3 illustrate how a single channel of a multiplexing digital facility, e.g., a T-carrier system, can be used in lieu of a metallic trunk. Interface unit 201 is located within channel unit 204 of channel bank 250. Interface unit 201 supplies a signal source to loop 102 and detects the signals in alarm transmitter loop 102 responsive to the supplied signal source and the status of alarm transmitters 103, 104, 105 and 106. The detected signals are then encoded within interface unit 201 into digital signals which are transmitted through T-carrier facility 300 to interface unit 301 within channel unit 304. The encoded digital signals can be regenerated one or more times, within the T-carrier facility, through the use of repeater 200. Interface unit 301, within channel unit 304 of channel bank 350, receives the encoded digital signals and regenerates the signals from alarm transmitter loop 102. The regenerated signals are then transmitted to the alarm receiver via loop 109. This regeneration makes all resistance through the T-carrier facility and alarm transmitter loop transparent to the end-to-end alarm circuit. As a result, the maximum design length of the McCulloh circuit can be increased.

Interface unit 301 also encodes signals on alarm loop 109 indicative of normal battery or double battery and transmits a digital signal through the T-carrier facility to interface unit 201. This signal varies the signal source supplied to alarm transmitter loop 102 to maintain, as previously described, end-to-end alarm circuit integrity if a fault, e.g., an open circuit, exists in the conductors of alarm loop 102.

Interface unit 201 comprises alarm transmitter loop sensing circuit 202 and coder 203. Sensing circuit 202 supplies a signal source, e.g., either normal battery or double battery, to the tip and ring ends of loop 102. The signal source supplied is controlled from the alarm receiver. Preferably, interface unit 301 also automatically changes the signal source supplied from normal battery to double battery and vice versa. Sensing circuit 202 also detects the signals at the tip and ring ends of loop 102 responsive to the supplied source and status of the alarm transmitters. The detected signals are coupled via leads 205, 206, 207 and 208 to coder 203.

Coder 203 generates a pair of digital signals, the first signal representing closure of loop 102 and the second representing grounding of loop 102, which are gated via leads 211 and 212 to common equipment 213. The gating of signals onto leads 211 and 212 is controlled by control signals supplied from the common equipment 213 to the channel units. Common equipment 213 combines the signals from coder 203 within channel unit 204 with signals from other channel units, such as channel units 215 and 216, to form the well-known DS1 digital signal format. The other channel units may be identical to channel unit 204 or may be any of the commercially available channel units.

A frame of DS1 formatted digital signals comprises 24 eight bit pulse code modulation (PCM) words along with a framing bit. Common equipment 213 encodes each PCM word from sampled analog signals supplied by each channel unit. Each sampled analog signal is gated onto a transmit data lead (not shown) between common equipment 213 and each channel unit. Each channel unit also gates signaling information, such as dial pulses and supervisory changes of state over multiple signaling leads 211 and 212 to common equipment 213. The gating of signaling information is controlled by signals supplied by the common equipment 213. Common equipment 213 substitutes the supplied signaling information for the least significant or eighth bit within the PCM coded words every sixth frame. The signaling bits substituted into a first frame are referred to as A signaling bits and the next set of signaling bits six frames later are designated as B signaling bits. Hence, a pattern of A, B, A, B, etc., signaling bits are formed over time. Common equipment 213 also inserts the framing bit along with A and B signaling subframe bits, the subframe bits being used to identify the frames comprising signaling bits. For further details on the channel unit-common equipment hierarchy and the DS1 format, see U.S. Pat. No. 4,059,731 to Green et al and an article entitled "The D3 Channel Bank" by W. B. Gaunt et al, Bell Laboratories Record, August 1972, pages 229–233.

In the disclosed embodiment, channel unit 204 only supplies "signaling" information to common equipment 213. Specifically, the signal on lead 513 representing closure of loop 102 is gated onto lead 211 via open collector NAND gate 515 and the CLK A signal while the signal on lead 514 representing the grounding of loop 102 is gated via open collector NAND gate 516 and the CLK B signal onto lead 212. CLK A and CLK B are clock signals, derived in all channel units from control signals supplied by the common equipment. Common equipment 213 inserts the logical signals on leads 211 and 212 into the A and B signaling bit positions, respectively, associated with channel unit 204. The use of the A signaling bit for closure and the B signaling bit for ground can, of course, be reversed. This use of A and B signaling bit positions to convey the status of the alarm transmitter allows the use of presently available common equipment within the commercially available D3 and D4 channel banks without modification. In addition, the gating of signaling information from channel unit 204 to common equipment 213 and vice versa under the control of signals from the common equipment 213, as is done in the D3 and D4 channel bank, is also unaffected by the present invention. Furthermore, successive A and B signaling bits reoccur every 1.5 milliseconds. In assigning a unique alarm sequence to each transmitter, the differences in time duration for any of the three alarm states is significantly greater than 1.5 milliseconds. Hence, the particular alarm transmitter signaling an alarm can be readily identified using prior art techniques.

After transmission through the T-carrier facility, the DS1 formatted bit stream is supplied to common equipment 313 within channel bank 350 and the signaling information from channel units 204, 215 and 216 on lead 363 is gated under the control of signals from common equipment 313 to channel units 304, 315 and 316, respectively. Interface unit 301 within channel unit 304 comprises sensing circuit 302 and coder 303. The signaling information on lead 363 is supplied to the D input of flip-flop 361 and 362 in channel unit 304. Flip-flops 361 and 362, respectively clocked by CLK A and CLK B, gate the A signaling bit to lead 312 and the B signaling bit to lead 311.

Lead 312 conducts the A signaling bit, representing closure of loop 102, to switch toggle 317. A logical "0" loop closure signal causes toggle 317 to switch to terminal 318 and close loop 109. Similarly, a logical "1" switches toggle 317 to terminal 319 to open loop 109. Lead 311 conducts the B signaling bit, representing the grounding of loop 102 to switch toggle 320. A logical "0" applied to toggle 320 switches the toggle to terminal 321 to ground loop 109 while a logical "1" switches the toggle 320 to terminal 322 to open loop 109. The use of electrically-controlled switch toggles 317 and 320 are, of course, merely illustrative of a myriad of apparatus, such as relays or electronic circuits, which can perform the same functions.

When loop 109 is closed, the current flowing from tip to ring, caused by the application of a normal battery by the alarm company, turns on light-emitting diode 325. Diode 325 and transistor 328 comprise an opto-isolator. The light generated by diode 325 turns on transistor 328 to generate a logical "0" signal at node 331. In similar fashion, a logical "1" coupled to lead 312 opens loop 109 to turn off light-emitting diode 325 and transistor 328. When transistor 328 is off, a logical "1" signal is generated at node 331. Diode 325 and transistor 328 are also off when a double battery is supplied to loop 109 by the alarm company. Delay circuit 330 couples the logical state of node 331 to lead 332 after a predetermined delay. The logical state on lead 332 indicates the signal source to be applied to loop 102. Logical "0" represents normal battery and logical "1" represents double battery.

The delay introduced by delay circuit 330 is typically 3 seconds. This time interval is significantly longer than the time interval an alarm transmitter opens lead 102 during any time coded alarm sequence. Hence, interface unit 304 will automatically cause loop 102 to be supplied with a double battery when loop 102 is open for longer than 3 seconds and revert back to normal battery when the open circuit in loop 102 no longer exists. As discussed above, this change from normal battery to double battery maintains integrity of the alarm circuit by allowing any alarm transmitter to signal the grounding state in the 3-state McCulloh alarm sequence.

The signal on lead 332 is supplied to an input of open collector NAND gate 365. NAND gate 365, clocked by CLK C derived from control signals supplied from common equipment 313 to all channel units, strobes the logical signal on lead 332 onto lead 364. Lead 364 conducts signaling information from all channel units to common equipment 313. Common equipment 313 is identical and provides the same function as common equipment 213. The signaling information on lead 364 is inserted by common equipment 313 into the A signaling bit position for channel unit 304 within the DS1 format. It should be noted that only one signaling bit position in the DS1 format is utilized for communication from interface unit 301 to interface unit 201. This signaling bit can, of course, also be the B signaling bit position.

Resistor 323 and varistor 327, located within sensing circuit 302, provide lightning surge protection for light-emitter diode 325. Resistors 324 and 326 are used to provide appropriate biasing for light-emitting diode 325 while resistor 329 connected between a low level voltage source and the collector of transistor 324 provides appropriate transistor biasing. Resistor 331 is connected to the tip end of loop 109 to match the load of the illustrated circuitry connected to the ring end of loop 109.

Common equipment 213 receives the DS1 formatted bit stream after transmission through the T-carrier facility and supplies the A signaling bits to all channel units on lead 220. Flip-flop 262, clocked by CLK A, gates the A signaling bit to input terminal 221. The logical signal at terminal 221 is converted within coder 203 into a pair of signal source control signals on leads 209 and 210. The logical levels on leads 209 and 210 are "0" and "1" respectively for normal battery and "1" and "0" respectively for double battery.

Figure 4:
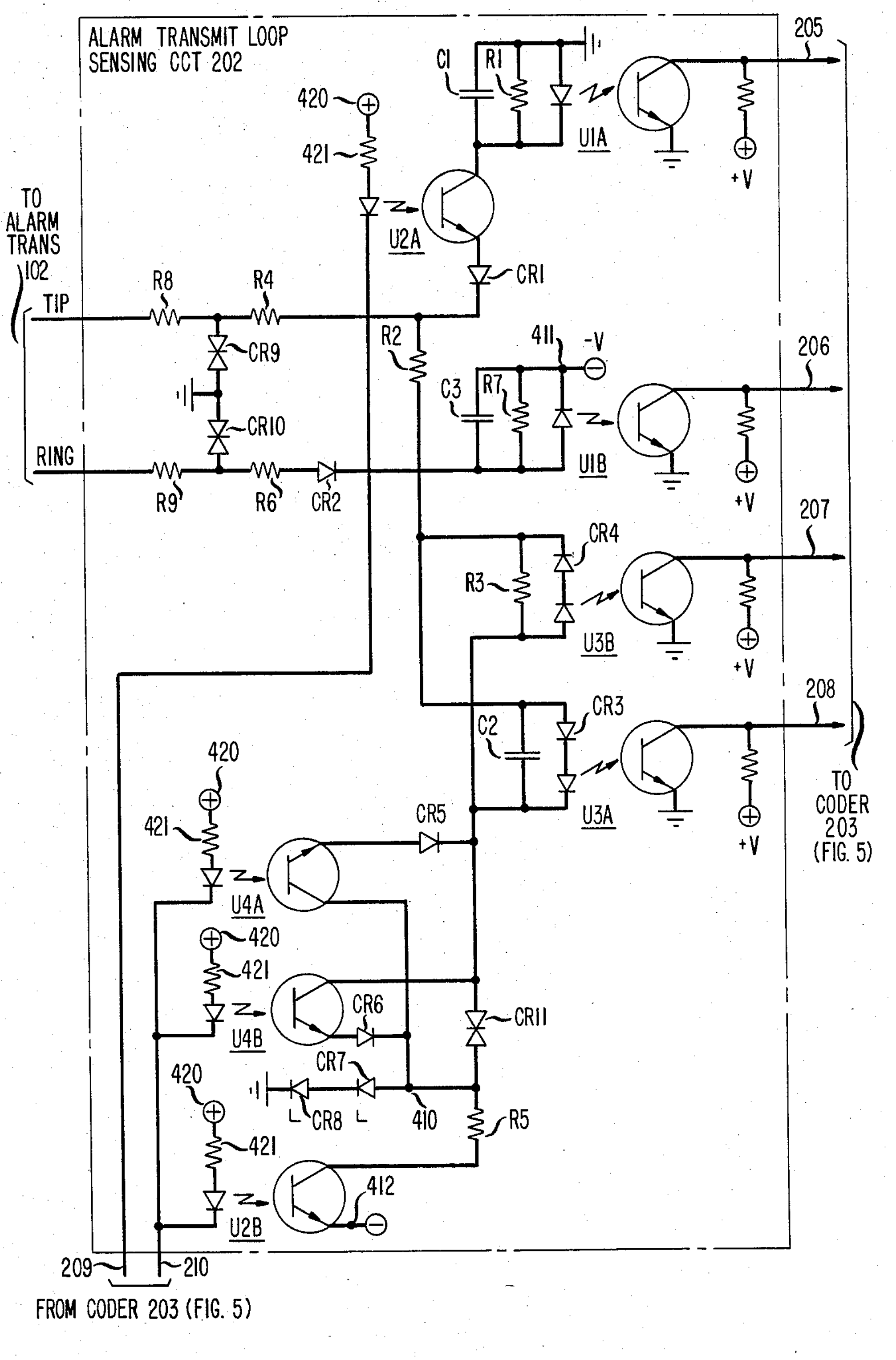
FIG. 4 is a schematic diagram of the sensing circuit within the first interface unit of FIG. 2.

Referring now to FIG. 4 which shows the detailed circuitry within alarm transmitter loop sensing circuit 202. Under normal battery operation, the logical "0" on lead 209 turns the transistor portion of opto-isolator U2A on while the logical "1" on lead 210 turns opto-isolators U2B, U4A and U4B off. Ground is applied through the diode portion of opto-isolator U1A and the transistor portion of opto-isolator U2A to the tip end of loop 102. Office battery, −V, is applied to nodes 411 and 412. In the absence of an alarm condition, current flows through loop 102 from tip to ring and turns opto-isolators U1A and U1B on. The outputs of opto-isolators U1A and U1B are supplied to coder 203 on leads 205 and 206. During an alarm condition, the outputs of opto-isolators U1A on U1B on leads 205 and 206 reflect the time-coded McCulloh alarm sequence. An open circuit fault will result in both opto-isolators U1A and U2A being turned off.

Under double battery operation, the logical "1" on lead 209 turns opto-isolators U2A off while the logical "0" on lead 210 turns opto-isolator U2B, U4A and U4B on. When U2B is activated, voltage regulating diodes CR7 and CR8 conduct. This diode combination breaks down at −24 volts and is current limited by resistors R2 and R5. If an open circuit in loop 102 exists, the voltage difference between nodes 410 and 411 permits alarm transmitter signaling through opto-isolators U3A and U4B or opto-isolator U1B depending on the location of the alarm transmitter relative to an open circuit fault in loop 102. The current flow during the third alarm state, i.e., the grounding of loop 102, is sensed by opto-isolators U1B and U3A. Leads 206 and 208 connect the outputs of opto-isolators U1B and U3A to coder 203. Similarly, if an unintended short to ground exists, it will also be detected by opto-isolator U1B and U3A. The disclosed sensing circuit also provides a signal on lead 208 if a fault in loop 102 has been corrected. For example, under double battery operation, opto-isolator U3A is off but will turn on after an open circuit fault has been corrected.

Resistors R1, R3 and R7 set the threshold current for the light-emitting diode portions of opto-isolators U1A, U3B and U1B. Surge protection of the sensing unit circuitry is provided by diodes CR9 and CR10 along with resistors R4, R6, R8 and R9. Diodes CR1 through CR6 protect the opto-isolators from reverse voltage polarity during surge and fault conditions. Diodes CR11, CR5 and CR6 further protect the transistor portions of U4A and U4B during surge conditions. Low voltage, e.g., +5 volt, sources 420 and resistors 421 set appropriate biasing for opto-isolators U2A, U2B, U4A and U4B.

Figure 5:
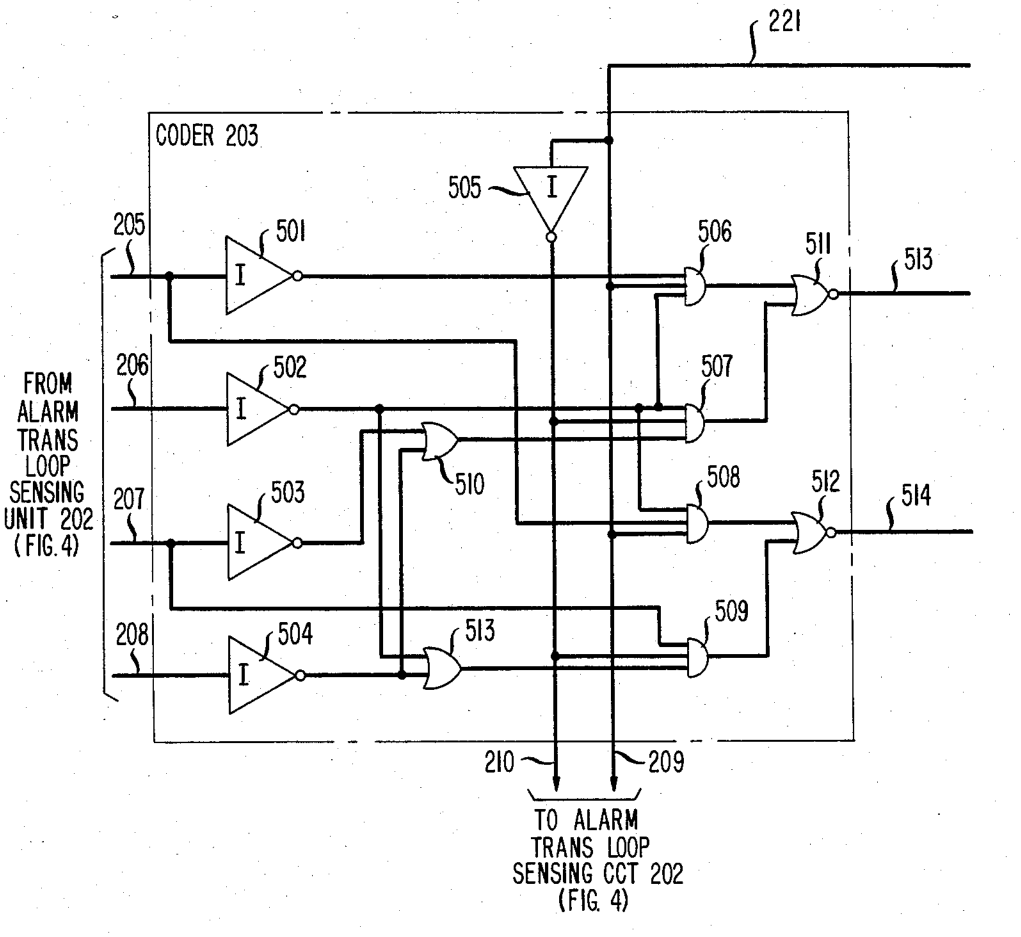
FIG. 5 is a schematic diagram of the coder within the first interface unit of FIG. 2.

Referring to FIG. 5, coder 203 receives the outputs of opto-isolators U1A, U1B, U3A and U3B on leads 205, 206, 207 and 208 and the signal source control signal at terminal 221 and transforms the signals on these leads into the loop closure (LC) signal on lead 513 and the ground (GRD) signal on lead 514. The coder comprises inverters 501–505, AND gates 506 through 509, OR gates 510 and 517 and NOR gates 511 and 512. The signal levels on output leads 205, 206, 207 and 208 are logical "0" when the corresponding opto-isolator is on and logical "1" when the corresponding opto-isolator is off.

The signal source control signal at terminal 221 is converted within coder 203 into a pair of a normal battery and double battery signals on leads 209 and 210. These signal pairs also gate AND gates 506, 507, 508 and 509.

Figure 6:
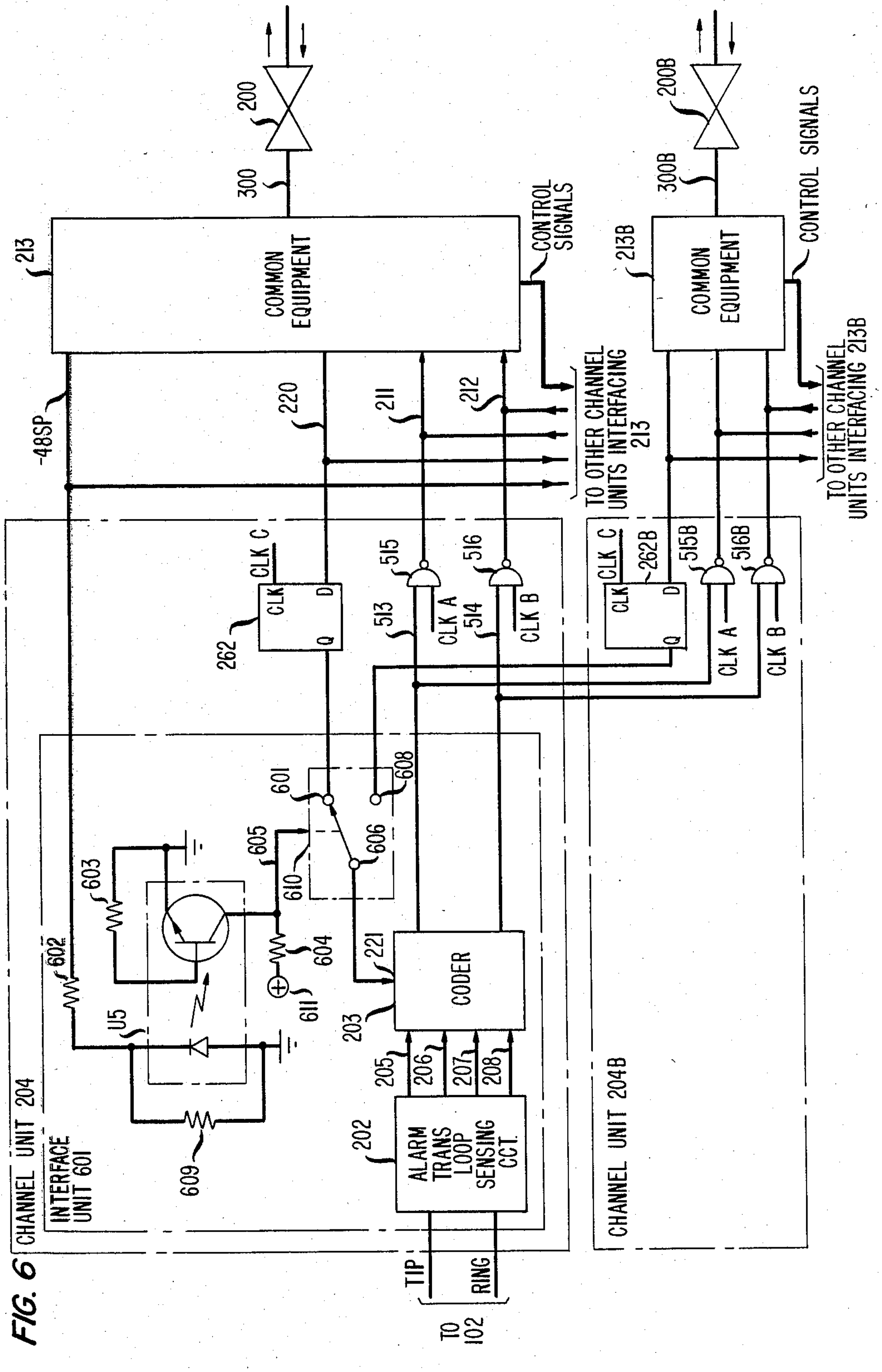
FIGS. 6 and 7 are a second illustrative schematic block diagram, in accordance with the present invention, for communications between one or more alarm transmitters and a remote alarm receiver.
Figure 7:
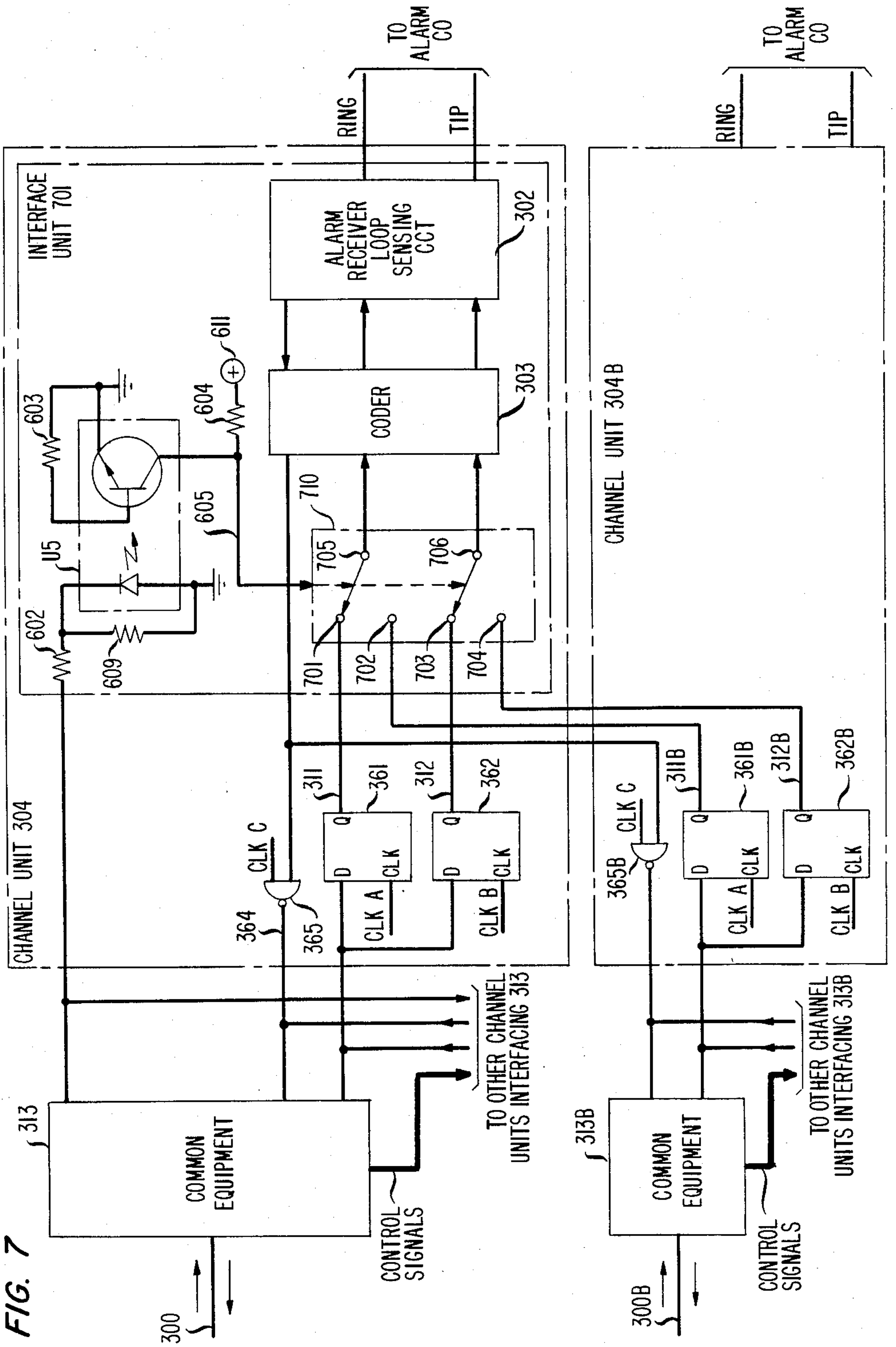

In a second embodiment of the present invention, as shown in FIGS. 6 and 7, end-to-end alarm circuit reliability is enhanced by adapting the above-described interface units for transmitting and receiving digital signals over two digital transmission facilities. These facilities, designated as 300 and 300B, may comprise one or more repeaters 200 and 200B, respectively. The use of facilities 300 and 300B assures continued alarm circuit operation despite failure of facility 300.

Interface unit 601, disposed within channel unit 204, is identical to interface unit 201 except for the addition of opto-isolator circuitry and switch 610. The opto-isolator circuitry comprises opto-isolator U5, low voltage source 611 and biasing resistors 602, 603, 604 and 609. The same opto-isolator circuitry along with electronic switch 710 is added to interface unit 701 located within channel unit 304. Interface unit 701 is otherwise identical to interface unit 301.

The transmission of signals from coders 203 and 303 over digital facility 300 is identical to that disclosed with reference to FIGS. 2 and 3. In addition, the outputs of coder 203 and coder 303 are coupled respectively to channel units 204B and 304B and thence to common equipment 213B and 313B. The logic gates within channel units 204B and 304B and common equipment 213B and 313B perform the same function as their counterparts associated with facility 300. Accordingly, the outputs of coder 203 and 303 are independently transmitted over facility 300 and 300B.

Switch terminals 701 and 703 receive the coder 203 output signals transmitted over facility 300 while switch terminals 702 and 704 receive the same output signals transmitted over facility 300B. When facility 300 is operating properly, opto-isolator U5 is off and a logical "1" signal is generated on lead 605. The signal on lead 605 controls switch toggles 711 and 712 of electronic switch 710. A logical "1" couples terminal 701 to terminal 705 and terminal 703 to terminal 706. Terminals 705 and 706 are respectively coupled to toggles 320 and 317 in coder 303. However, if common equipment 313 is not receiving signals properly from facility 300, opto-isolator U5 turns on and generates a logical "1" on lead 605 which switches toggle 711 to terminal 702 and toggle 712 to terminal 704. As a result, the output signals of coder 203 transmitted over facility 300B are supplied to coder 303. In similar fashion, when opto-isolator U5 within interface unit 601 is on, a logical "1" on lead 605 switches toggle 606 to terminal 607. This connects the output from coder 303 transmitted over facility 300 to input terminal 221 of coder 203. In the event common equipment 213 is not receiving digital signals properly from facility 300, opto-isolator U5 turns on and generates a logical "0" on lead 605. A logical "0" switches toggle 606 to terminal 608 so as to connect the output of coder 303 transmitted over facility 300B to input terminal 221.

Opto-isolator U5 operates in response to the signal condition on lead −48SP. This lead runs from the common equipment to all interfacing channel units in the D3 and D4 channel banks. When digital signals are being received properly by common equipment 213 and 313, lead −48SP is grounded and opto-isolator U5 is off. When a fault condition exists in digital facility circuitry within the common equipment detecting the fault, i.e., either 213 or 313, supplies a negative voltage to −48SP which turns opto-isolator U5. The operation of opto-isolator U5 within interface units 601 and 701 operate independently of one another.

The enhanced end-to-end circuit reliability resulting from the use of opto-isolator circuitry and switches 610 and 710 can, of course, be expanded to allow bidirectional communications over more than two digital facilities. Such expansion only requires the use of the disclosed opto-isolator circuitry and appropriate switch within the channel units associated within the "back-up" digital facilities. For example, when interface unit 601 activates switch 610 to receive signals from facility 300B, channel units 204B could activate a second switch, in response to its −48SP control signal, to couple signals from a third digital facility to interface units 601.

It should be noted that the present invention can be utilized in a variety of system applications. First, the present invention can interface other digital transmission facilities, such as the subscriber loop carrier system, utilizing a DS1 signal format. Second, while the present disclosure shows the generation of digital signals LC and GRD, the present invention can be employed in alarm circuits, other than McCulloh circuits, which only utilize either signal LC or GRD. Finally, while loops 102 and 109, as disclosed, comprise metallic conductors, loops 102 and 109 can comprise optical conductors or radio links. Such variations merely require a change in the detectors utilized to sense the signals in loops 102 and 109.

What is claimed is:

1. Apparatus for interfacing a communications loop comprising one or more alarm transmitters with one or more digital transmission facilities which transmit multiplexed digital signals in a predetermined format including a predetermined number of digital words and a framing bit forming a frame, each word representing a corresponding transmission channel and having a predetermined number of bits, a predetermined one of the bits in each word being used as a signaling bit position during one frame out of a predetermined number of frames, said signaling bit position alternating between A and B signaling bit positions, said apparatus being characterized by means for supplying a signal source to said loop, said source being varied in response to a first signal received from one of said digital facilities;

means for sensing a second signal in said loop responsive to said source and the status of the alarm transmitters;

means responsive to said sensed second signals for generating one or more digital output signals indicative of the status of said alarm transmitters; and means for inserting said output signals within said A and B signaling bit positions for a channel within each of said digital facilities.

2. The apparatus of claim 1 further comprising means for generating a control signal indicative of whether or not digital signals are being properly received and means responsive to said control signal for selecting said one of said digital facilities.

3. The apparatus of claim 1 wherein signals received from one of said digital facilities are within a predetermined one of the A and B signaling bit positions for said channel.

4. The apparatus of claim 3 wherein said means for supplying and said means for sensing comprise opto-isolators.

5. Apparatus for interfacing a communications loop having changeable signal transmission properties comprising an alarm receiver with one or more digital transmission facilities which transmit multiplexed digital signals in a predetermined format including a predetermined number of digital words and a framing bit forming a frame, each word representing a corresponding transmission channel and having a predetermined number of bits, a predetermined one of said bits in each word being used as a signaling bit position during one frame out of a predetermined number of frames, said signaling bit position alternating between A and B signaling bit positions, said apparatus being characterized by means responsive to one or more digital signals from one of said digital facilities for changing the signal transmission properties of said loop;

means for sensing a signal on said loop responsive to said alarm receiver and the signal transmission properties of said loop and generating a digital output signal therefrom; and means for inserting said output signal within a predetermined one of said A and B signaling bit positions for a channel within each of said digital facilities.

6. The apparatus of claim 5 further comprising means for generating a control signal indicative of whether or not digital signals are being properly received and means responsive to said control signal for selecting one of said digital facilities.

7. The apparatus of claim 5 wherein digital signals received from one of said digital facilities are within a predetermined one of the A and B signaling bit positions for said channel.

8. The apparatus of claim 7 wherein said means for sensing comprises an opto-isolator.

9. A system for providing bidirectional communications between a communications loop comprising one or more alarm transmitters and a second communications loop having changeable signal transmission properties and comprising an alarm receiver; said system being characterized by one or more digital transmission facilities which transmit multiplexed digital signals in a predetermined format including a predetermined number of digital words and a framing bit forming a frame, each word representing a corresponding transmission channel and having a predetermined number of bits, a predetermined one of the bits in each word being used as a signaling bit position during one frame out of a predetermined number of frames, said signaling bit position alternating between A and B signaling bit positions, first apparatus for interfacing said communication loop with said digital facilities, said apparatus comprising means for supplying a signal source to said loop, said source being varied in response to a first digital signal received from one of said digital facilities, means for sensing second signals in said loop responsive to said source and the status of the alarm transmitters, means responsive to said sensed second signals for generating one or more digital output signals, and means for inserting said digital output signals within said A and B signaling bit positions for a channel within each of said digital transmission facilities; and second apparatus for interfacing said digital facilities and said second communications loop comprising means responsive to said one or more digital signals for changing the signal transmission properties of said second communications loop, and means for sensing a third signal in said second loop responsive to said alarm receiver and the signal transmission properties of said second loop and generating said second digital signal.

* * * * *